(12) United States Patent
Ogawa

(10) Patent No.: US 7,981,230 B2
(45) Date of Patent: Jul. 19, 2011

(54) METHOD AND JOINING JIG FOR FABRICATION OF AN OPTICAL DEVICE

(75) Inventor: Yoshiyuki Ogawa, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 830 days.

(21) Appl. No.: 11/982,941

(22) Filed: Nov. 6, 2007

(65) Prior Publication Data

US 2008/0105357 A1    May 8, 2008

(30) Foreign Application Priority Data

Nov. 7, 2006  (JP) ................................. 2006-301190

(51) Int. Cl.
  *B32B 17/00*  (2006.01)
  *C03C 27/00*  (2006.01)
  *G02C 7/00*  (2006.01)
(52) U.S. Cl. .......... 156/99; 156/250; 156/252; 156/253; 156/538; 156/539; 359/495; 359/496
(58) Field of Classification Search .................... 156/94, 156/98, 99, 250, 252, 253, 256, 538, 539; 264/36.1, 36.18; 359/495, 496
See application file for complete search history.

(56) References Cited

U.S. PATENT DOCUMENTS

| | | | | |
|---|---|---|---|---|
| 2,382,580 A | * | 8/1945 | Rackett | 359/638 |
| 5,867,314 A | * | 2/1999 | Ota et al. | 359/484 |
| 6,101,041 A | * | 8/2000 | Ishibashi et al. | 359/634 |
| 6,964,482 B2 | * | 11/2005 | Fujisawa et al. | 353/22 |

FOREIGN PATENT DOCUMENTS

JP    2000-143264    5/2000

* cited by examiner

*Primary Examiner* — Mark A Osele
*Assistant Examiner* — Christopher C Caillouet
(74) *Attorney, Agent, or Firm* — Brinks Hofer Gilson & Lione

(57) ABSTRACT

Two prisms bonded together in a bonding step are then, in a pressing step, put onto a joining jig and pressed to be formed into an optical device. The joining jig has a pair of holding plates arranged opposite each other and a precision plate held between parts of the directly opposite surfaces of the holding plates. In the pressing step, the two prisms are pressed with the surface of one of the prisms placed in contact with the surface of the precision plate exposed to the gap between the holding plates, with another surface of the same one of the prisms placed in contact with the directly opposite surface of one of the holding plates, and with the surface of the other of the prisms placed in contact with the directly opposite surface of the other of the holding plates. Thus, the two prisms move along the oblique surface of each other, and are pressed onto the directly opposite surfaces of the holding plates. Thus, irrespective of variations in the chamfering done on the two prisms, the exterior shape of the joined prism is restricted by the directly opposite surfaces of the holding plates.

15 Claims, 16 Drawing Sheets

SMALL

MEDIUM

LARGE

METHOD AND JOINING JIG FOR FABRICATION OF AN OPTICAL DEVICE

This application is based on Japanese Patent Application No. 2006-301190 filed on Nov. 7, 2006, the contents of which are hereby incorporated by reference.

BACKGROUND OF THE INVENTION

1. Field of the Invention

The present invention relates to a method for fabricating an optical device composed of two prisms bonded together, and also relates to a joining jig for use in the fabrication of such an optical device.

2. Description of Related Art

Today, following the advent of Blu-ray Disc and HD-DVD, prisms (for example, cubic joined prisms used as polarizing beam splitters) for use in optical pickups are required to have highly accurate exterior dimensions. For example, as shown in FIG. 16, whereas conventionally the tolerance for exterior dimensions such as vertical and horizontal widths is within about ±0.1 mm of the nominal dimensions, nowadays it is more often within ±0.05 mm of the nominal dimensions.

Moreover, in pickup prisms, as shown in FIG. 17, the deviation of the optical axis of the reflected light relative to the optical axis of the incident light—called the beam shift—is often required to be within ±0.05 mm. The beam shift results chiefly from a deviation of the junction surface (reflective surface) between two prisms. Specifically, if the junction surface deviates to one of the positions indicated by broken lines in FIG. 17, a beam shift arises in the emergent light.

Thus, today, pickup prisms are required to have accurate exterior dimensions and a small beam shift at the same time.

Against this background, there have conventionally been proposed various methods for fabricating pickup prisms. For example, according to the method disclosed in JP-A-2000-143264 (see, in particular, claim 1 and FIG. 3), as shown in FIG. 18, plates of a glass material having a beam-splitting optical thin film applied over them are laid on top of another with an optical adhesive (for example, an ultraviolet-curing adhesive) into the shape of stairs, and are then processed into pieces having the desired cubic shape through a procedure consisting of the steps of cutting, polishing, anti-reflection film coating, laying-together, cutting, polishing, and cutting.

With this method, it is possible to use plates of a glass material, which are relatively inexpensive; in addition, it is possible to fabricate a large number of prisms through a sequence of processing steps. Thus, it is possible to fabricate prisms at low cost. On the disadvantageous side, the method involves repeated laying-together, cutting, and polishing, and is thus liable to suffer from accumulated processing errors. As a result, as shown in FIG. 19, it is difficult to form the junction surface 101—the accuracy of the position of which affects the beam shift—at a position accurate enough to achieve the tolerated beam shift.

Another conventionally proposed method for fabricating pickup prisms employs long-size triangular prisms. According to this method, as shown in FIG. 20, first, two long-size triangular prisms 201 and 202 are prepared. Of these prisms, one has a beam-splitting optical thin film and an anti-reflection optical thin film applied over it, and the other has an anti-reflection optical thin film applied over it. Next, the long-size triangular prisms 201 and 202 are joined together with an optical adhesive (for example, an ultraviolet-curing adhesive), and are then pressed into a V-shaped groove 203a in a joining jig 203 so that the adhesive is cured with the 45-degree vertices at the top of the junction surface put together under a pressure. Thereafter, the long-size prism 204 thus obtained is cut into discrete prisms having a cubic shape.

With this method, as shown in FIG. 21, by controlling the height of the long-size triangular prisms 201 and 202 within ±0.035 mm of the nominal dimension, it is possible to obtain prisms with the tolerated beam shift (within ±0.05 mm) (in actual fabrication, for an ample margin of safety, the height of the long-size triangular prisms is controlled more strictly). Here, when one of the obtained cubic prisms is assembled into an optical pickup, it is positioned with positioning pins 205 placed in contact with the shorter sides—those intersecting at right angles—of one of the two triangular prisms joined together, more specifically the one having the beam-splitting optical thin film formed on it. In this way, it is possible to easily control the beam shift within the range mentioned above.

The trouble here is that, as shown in FIG. 22, the long-size triangular prisms 201 and 202 generally have their 45-degree ridges (corners) chamfered to about C0.1 to C0.2 for crack prevention. Here, chamfering to about C0.1 to C0.2 denotes cutting a corner off at a position of 0.1 to 0.2 mm from the edge. A variation in the chamfering here causes a deviation in the joining of the long-size triangular prisms 201 and 202 under a pressure. This increases the difference between the vertical and horizontal widths of the eventually obtained cubic prisms, and thus makes it difficult to obtain the desired accuracy in exterior dimensions.

SUMMARY OF THE INVENTION

In view of the inconveniences mentioned above, it is an object of the present invention to provide a method for fabricating an optical device, and a jig for use in the fabrication of such an optical device, by and with which it is possible to achieve the tolerated beam shift and the desired accuracy in exterior dimensions at the same time.

According to one aspect of the present invention, a method for fabricating an optical device include: a bonding step of bonding two prisms together with an adhesive; and a pressing step of putting the two prisms, thus bonded together, onto a joining jig and pressing the prisms. Here, the joining jig includes: a pair of holding plates arranged opposite each other; and a precision plate held between parts of the directly opposite surfaces of the holding plates. Moreover, in the pressing step, the two prisms are pressed with a surface of one of the prisms placed in contact with the surface of the precision plate exposed to the gap between the holding plates, with another surface of the same one of the prisms placed in contact with the directly opposite surface of one of the holding plates, and with a surface of the other of the prisms placed in contact with the directly opposite surface of the other of the holding plates.

According to another aspect of the present invention, a joining jig used to press two prisms that have been bonded together with an adhesive includes: a pair of holding plates arranged opposite each other; and a precision plate held between parts of the directly opposite surfaces of the holding plates. Here, when the two prisms are put onto the joining jig and pressed, the surface of the precision plate exposed to the gap between the holding plates is placed in contact with the surface of one of the prisms, the directly opposite surface of one of the holding plates is placed in contact with another surface of the same one of the prisms, and the directly opposite surface of the other of the holding plates is placed in contact with the surface of the other of the prisms.

BRIEF DESCRIPTION OF THE DRAWINGS

These and other objects and features of the present invention will be apparent from the following detailed description of preferred embodiments thereof taken in conjunction with the accompanying drawings, in which.

DETAILED DESCRIPTION OF PREFERRED EMBODIMENTS

Hereinafter, an embodiment of the present invention will be described with reference to the drawings.

1. Joining Jig

Figure 2A:
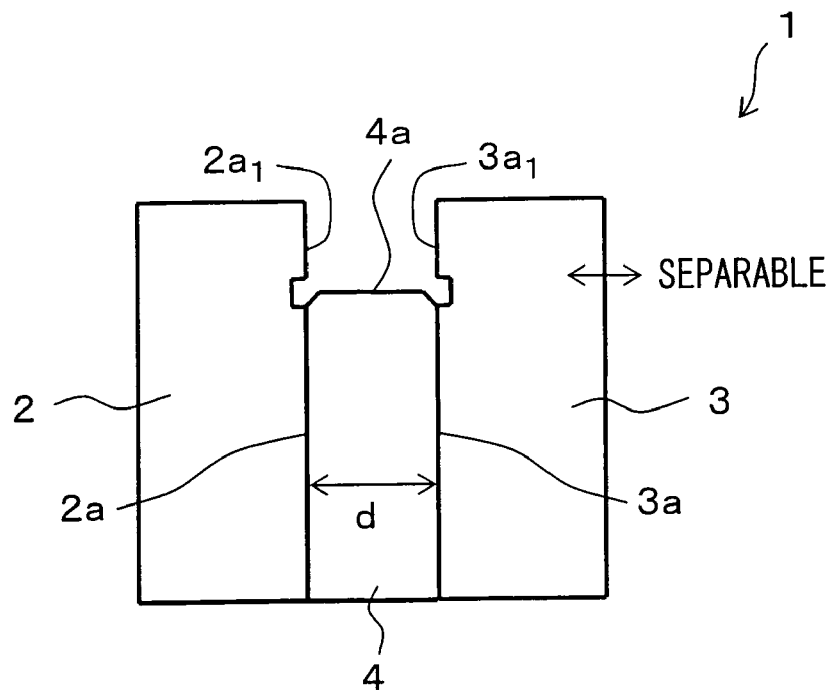
FIG. 2A is a sectional view showing an outline of the structure of a joining jig used to fabricate the above optical device.

First, the joining jig used in this embodiment will be described. FIG. 2A is a sectional view showing an outline of the structure of the joining jig 1. The joining jig 1 is used to press two prisms that have been bonded together with an adhesive, and is composed of a pair of holding plates 2 and 3 and a precision plate 4.

The holding plates 2 and 3 are arranged opposite each other, and have directly opposite surfaces 2a and 3a respectively. The precision plate 4 is located between the holding plates 2 and 3, and is held between parts of the directly opposite surfaces 2a and 3a. Thus, the precision plate 4 has a surface 4a exposed to the gap between the holding plates 2 and 3. In the following description, wherever necessary to refer to the parts of the directly opposite surfaces 2a and 3a of the holding plates 2 and 3 where they do not make contact with the precision plate 4—the parts of the directly opposite surfaces 2a and 3a that face each other across the gap mentioned above, they are referred to as directly opposite surfaces $2a_1$ and $3a_1$.

Figure 2B:
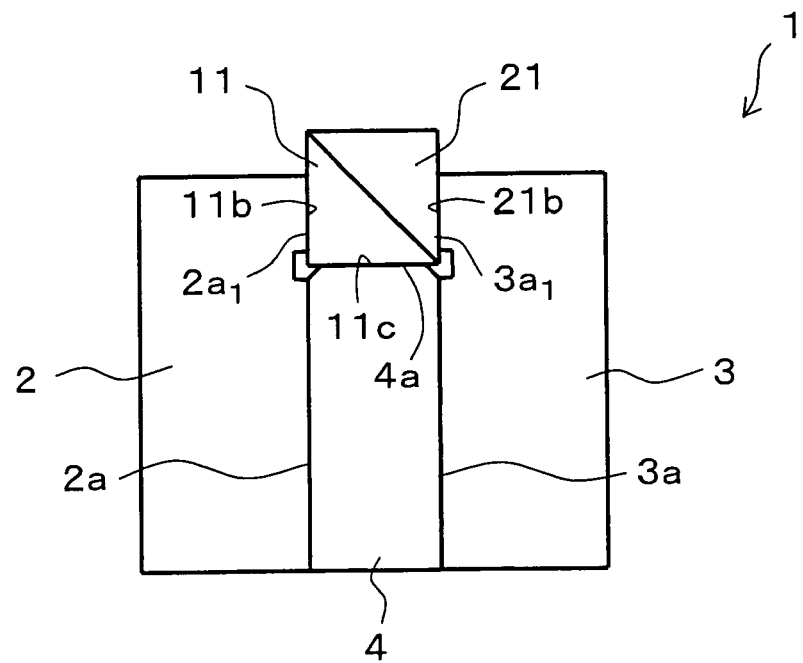
FIG. 2B is a sectional view of two prisms, bonded together, and the above joining jig as observed when the two prisms are put onto the joining jig.

As shown in FIG. 2B, when two prisms 11 and 21 (which are here assumed to be right-angled prisms) that have been bonded together with an adhesive are put onto the joining jig 1 and pressed, the surface 4a of the precision plate 4 is placed in contact with the surface 11c of one prism 11, the directly opposite surface 2a of one holding plate 2 is placed in contact with another surface 11b of the same prism 11, and the directly opposite surface 3a of the other holding plate 3 is placed in contact with a surface 21b of the other prism 21. Here, the surfaces 11c and 11b mentioned above are the surfaces of the prism 11 other than and facing its oblique surface; the surface 21b mentioned above is one of the surfaces of the prism 21 other than and facing its oblique surface. The prisms 11 and 21 may be long-size ones, or may be ones so long as to correspond to a single optical device that will eventually be obtained.

As described above, when the two prisms 11 and 21 are pressed by use of the joining jig 1, two surfaces of the prism 11 (the surfaces 11c and 11b) are placed in contact with two surfaces of the joining jig 1 (the surface 4a of the precision plate 4 and the directly opposite surface $2a_1$ of the holding plate 2), and one surface of the prism 21 (the surface 21b) is placed in contact with the directly opposite surface $3a_1$ of the holding plate 3. Thus, the two prisms 11 and 21 move along the oblique surface of each other, and are pressed onto the directly opposite surfaces $2a_1$ and $3a_1$ of the holding plates 2 and 3. Thus, irrespective of variations in the chamfering done on the two prisms 11 and 21, the exterior shape of the joined prism (optical device) is restricted by the directly opposite surfaces $2a_1$ and $3a_1$ of the holding plates 2 and 3. This helps easily obtain the desired accuracy in the exterior dimensions of the optical device.

In this embodiment, the directly opposite surfaces 2a and 3a, which face each other between the holding plates 2 and 3, are parallel to each other, and are both perpendicular to the surface 4a of the precision plate 4. Thus, when two right-angled prisms are used as the prisms 11 and 21, these can be pressed with their relevant surfaces placed in contact with the joining jig 1 as described above. In this way, it is possible to eventually obtain a joined optical device having a cubic shape with approximately equal vertical and horizontal widths. In a case where the prisms 11 and 21 are long-size ones, the obtained joined prism is then cut at predetermined widths into cubic joined prisms each like the one just mentioned.

Moreover, since the directly opposite surfaces 2a and 3a of the holding plates 2 and 3 are parallel to each other, two surfaces of the two prisms 11 and 21 (the surfaces 11b and 12b), which make contact with the directly opposite surfaces 2a and 3a, are parallel to each other. Thus, arranging the obtained optical device in an optical system such that light passes through the just mentioned two surfaces helps improve the eccentricity of the transmitted light.

Moreover, in this embodiment, the precision plate 4 has a width d (its dimension in the direction perpendicular to the directly opposite surfaces 2a and 3a of the holding plates 2 and 3) corresponding to the height of one of the two prisms 11 and 21 that are bonded together. Specifically, in this embodiment, as will be described later, the two prisms 11 and 21 that are bonded together are a combination of two prisms each belonging to one of the following three classes according to their height: small (with a height in the range of 2.828−0.02 to 2.828−0.01 mm); medium (with a height in the range of 2.828−0.01 to 2.828+0.01 mm); and large (with a height in the range of 2.828+0.01 to 2.828+0.02 mm). Correspondingly, for a given nominal dimension (4.000 mm), three precision plates 4 having different widths d are prepared, specifically: small (with a width of 3.975 mm), medium (with a width of 4.000 mm), and large (with a width of 4.025 mm). According to the height of one of the two prisms 11 and 21 combined together, one of the three precision plates 4 is selected and used.

As described above, the width d of the precision plate 4 is not equal to the width itself of, but commensurate with the height of, one of the prisms 11 and 21. Thus, even if there is a variation in the chamfering at a pointed part (part where an oblique surface forms an acute angle with a surface adjacent to it) of the prisms 11 and 21, it is possible to restrict the horizontal width of the optical device, that is, its width in the direction of the width of the precision plate 4.

Moreover, in this embodiment, the holding plate 3 is separable from the precision plate 4. The reasons will be explained below.

Figure 3:
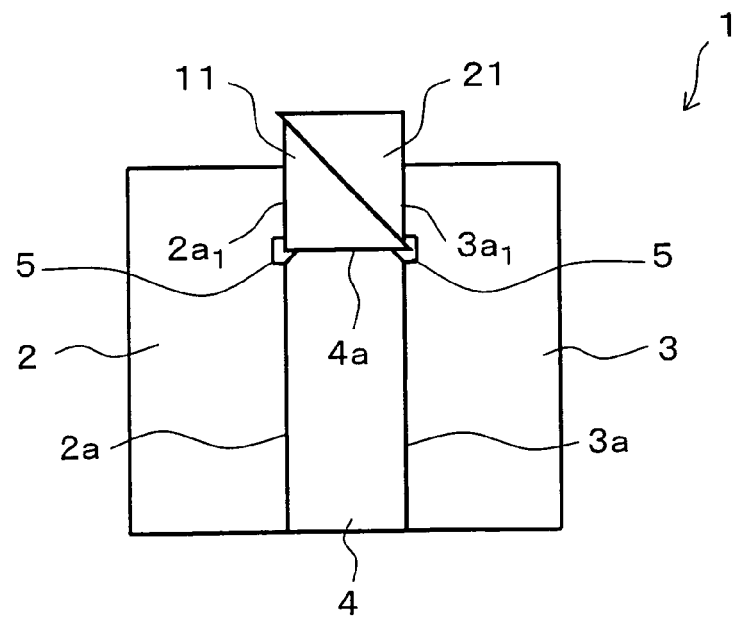
FIG. 3 is a sectional view of the above prisms and the above joining jig as observed when an edge of one of the prisms gets into a clearance in the joining jig.

The holding plates 2 and 3 and the precision plate 4 may be formed integrally. In that case, when the two prisms 11 and 21 that have been pressed are taken off the joining jig 1 upward, they may suffer scratches due to their contact with the directly opposite surfaces 2a, and 3a, of the holding plates 2 and 3. Besides, as shown in FIG. 3, at the corners of the bottom part of the hollow formed by the directly opposite surfaces $2a_1$ and $3a_1$, of the holding plates 2 and 3 and the surface 4a of the precision plate 4, clearances 5 are formed to avoid contact with the edges of the prisms 11 and 21. If, for example, the prism 11 is chamfered insufficiently, an edge of the prism 11 may get into a clearance 5, making it impossible to take the prisms 11 and 21 off upward (in the direction opposite to that in which they were put onto the jig).

By contrast, with the holding plate 3 separable from the precision plate 4, after the two prisms 11 and 21 are pressed, the holding plate 3 can be separated from the precision plate 4 so that the prisms 11 and 21 can easily be taken off. Thus, the prisms 11 and 21 are unlikely to suffer scratches due to contact with the directly opposite surfaces $2a_1$ and $3a_1$, and can easily be taken off the joining jig 1. This makes easy the handling of the prisms 11 and 21 that have been pressed.

These benefits can be obtained also when the other holding plate 2 is separable from 4, and also when both the holding plates 2 and 3 are separable from the precision plate 4. That is, in the joining jig 1, the holding plates 2 and 3 and the precision plate 4 may be formed integrally, but it is preferable that at least one of the holding plates 2 and 3 be separable from the precision plate 4.

2. Method for Fabricating an Optical Device

Next, how a joined prism, as an optical device, is fabricated by use of the joining jig 1 described above will be described.

For the sake of simplicity, the following description assumes that the accuracy desired in exterior dimensions in a 4×4 mm fabricated product (joined prism) is within ±0.05 mm and that the beam shift tolerated is within ±0.05 mm.

Here, the tolerated beam shift (within ±0.05 mm) can be achieved by adopting the above-described method of joining two (long-size) triangular prisms together. Spherically, by controlling the height of each triangular prism within 2.828±0.02 mm, it is possible to easily achieve the tolerated beam shift of within ±0.05 mm. Incidentally, when the fabricated product is positioned during assembly, either of the two prisms joined together may be used as a reference. It is however preferable that, as conventionally practiced, positioning be done with positioning pins placed in contact with two short sides—those on both sides of the 90-degree corner—of the prism having an optical thin film formed on it.

Figure 4:
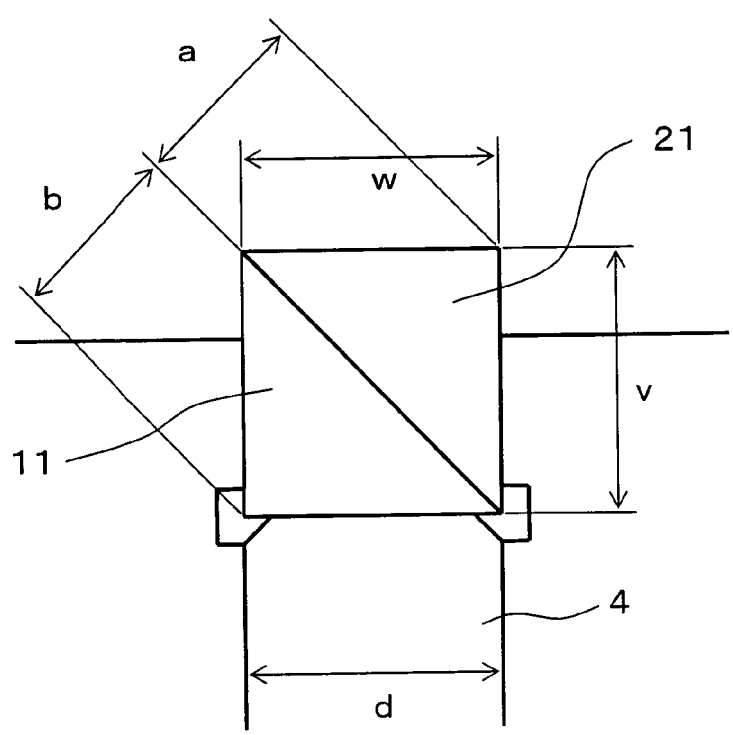
FIG. 4 is an enlarged sectional view showing the two prisms and part of the above joining jig where the prisms are put onto it.

On the other hand, the accuracy desired in exterior dimensions (within 4±0.05 mm) can be achieved in the following manner. FIG. 4 is an enlarged sectional view showing the two prisms 11 and 12 and the part of the joining jig 1 where they are put onto it. In the joining jig 1 structured as described above, the horizontal width w of the joined prism is uniquely determined by the width d of the precision plate 4 of the joining jig 1 (that is, w=d). On the other hand, the vertical width v of the joined prism depends on the height b of the prism 11 used, the height a of the prism 21 used, and the width d of the precision plate 4, and can be calculated according to the following formula based on geometric principles:

$$v = a \times \sqrt{2} + b \times \sqrt{2} - d$$

Accordingly, by properly setting the dimensions a, b, and d mentioned above, it is possible to control the horizontal and vertical widths w and v of the joined prism within the desired accuracy (within 4±0.05 mm). Here, all the variables (a, b, d, v, and w) are in mm.

Figure 1:
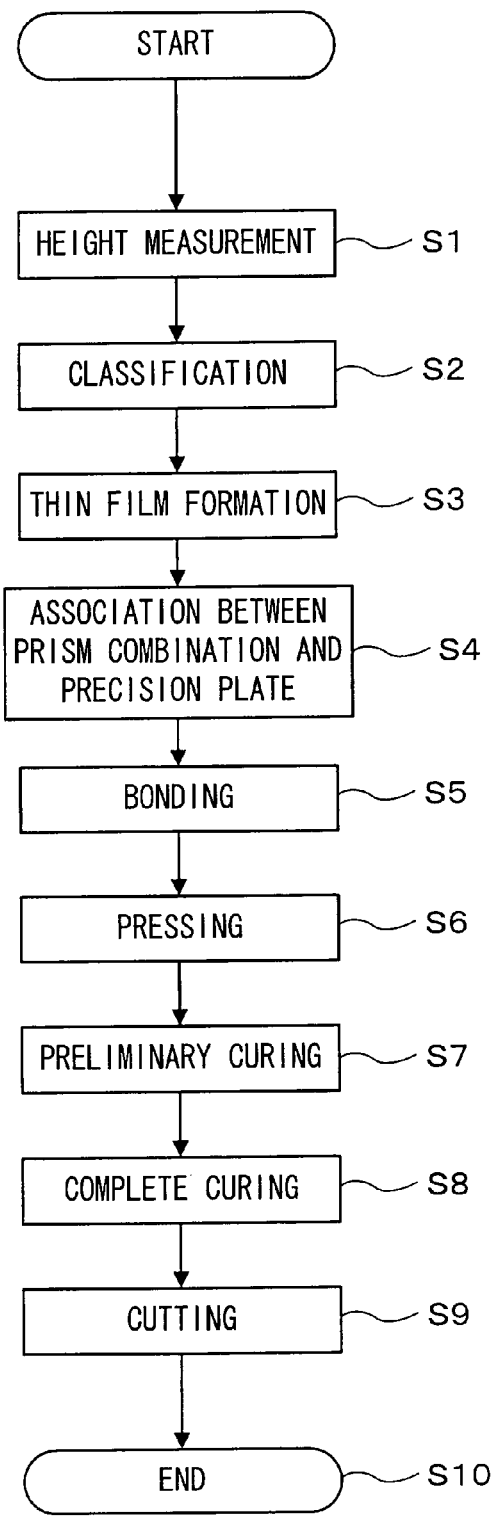
FIG. 1 is a flow chart showing the flow of the individual steps constituting a method for fabricating an optical device as one embodiment of the present invention.

Now, in light of the foregoing, the method whereby an optical device (joined prism) is fabricated in this embodiment will be described with reference to a flow chart in FIG. 1. Here, it is assumed that the prisms that are joined together are long-size right-angled triangular prisms with a right-angled isosceles triangular section.

First, the height of each procured prism 31 (see FIGS. 5A to 5C) is measured (S1, the height measurement step). Here, the height of a prism 31 denotes its height as measured with its oblique surface at the bottom (the distance from the vertex of the right-angled corner to the oblique surface). To allow for the pyramid error inherent in it, every prism 31 used is supposed to meet the requirements that (a) the height of the prism 31 at both ends be within 2.828±0.02 mm; and (b) the difference, in absolute terms, between the height of the prism 31 at one end and that at the other end be within 0.01 mm.

Figure 5A:
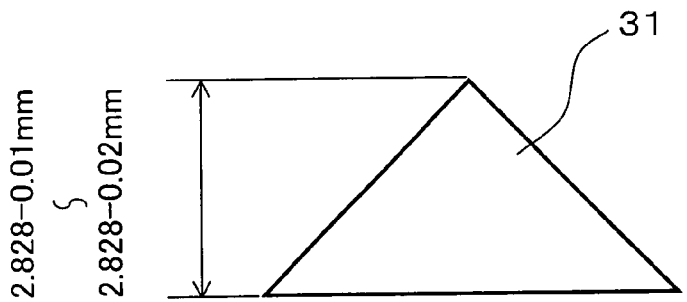
FIGS. 5A, 5B, and 5C are diagrams illustrating different classes into which prisms are classified according to their height.
Figure 5B:
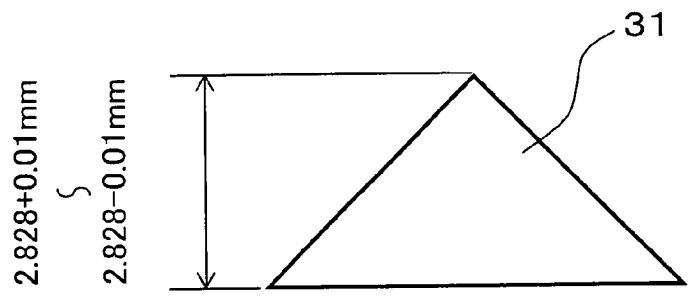
Figure 5C:
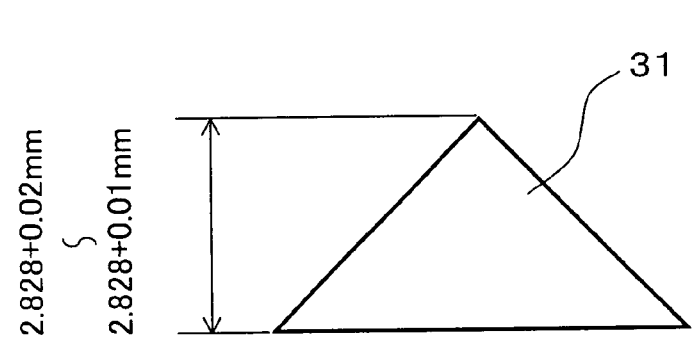

Next, as shown in FIGS. 5A to 5C, prisms 31 are classified into a plurality of classes according to their height (S2, the classifying step). Here, the average of the height of each prism 31 at one and the other end is calculated and, according to which of the ranges noted below the calculated average height falls in, the prism is classified into one of the following "small", "medium", and "large" classes:

small, with a height in the range of 2.828−0.02 to 2.828−0.01 mm;

medium, with a height in the range of 2.828−0.01 to 2.828+0.01 mm; and large, with a height in the range of 2.828+0.01 to 2.828+0.02 mm.

Figure 6A:
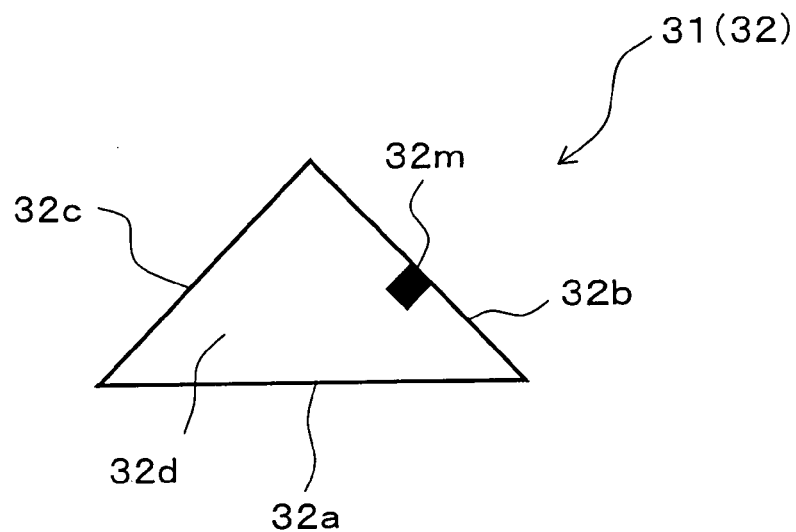
FIGS. 6A and 6B are sectional views of the two prisms that are bonded together.
Figure 6B:
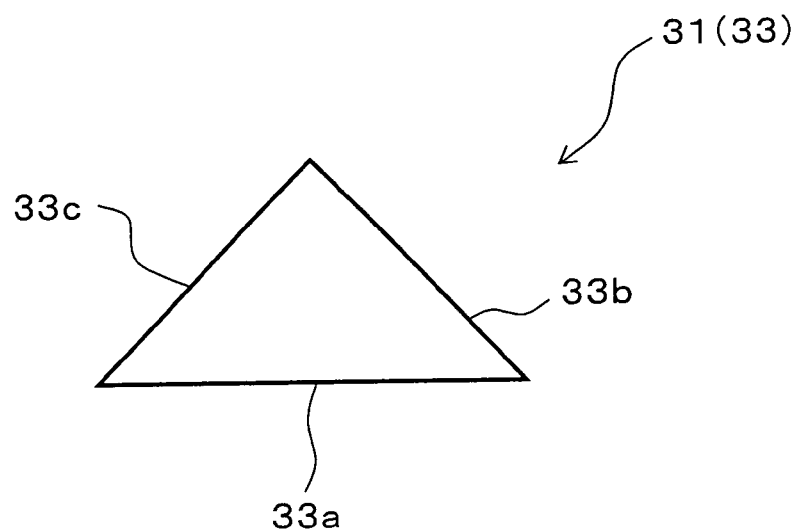

Subsequently, an optical thin film is formed on whichever prisms 31 need to have one formed on them (S3, the thin film forming step). More specifically, as shown in FIGS. 6A and 6B, of all prisms 31, those 32 which correspond to one prism 11 described previously have a polarizing beam splitting film 32p (see FIG. 8) formed on their oblique surface 32a—the surface at which they are joined, and have an anti-reflection film formed on their surfaces 32b and 32c facing the oblique surface 32a. On the other hand, of all prisms 31, those 33 which correspond to the other prism 21 described previously only have an anti-reflection film formed on their surfaces 33b and 33c facing the oblique surface 33a. Here, the polarizing beam splitting film 32p has an optical property such that it transmits or reflects light according to its polarization state; for example, it transmits P-polarized light, and reflects S-polarized light.

Every prism 32 having the polarizing beam splitting film 32p formed on it is marked with an identification mark 32m on one 32d of its side surfaces, near one 32b of its surfaces having the anti-reflection film formed on them. After joining, the identification mark 32m helps identify the prism 32 having the polarizing beam splitting film 32p formed on them, and helps the prism 32 to be put onto the joining jig 1 in the correct orientation (that is, it helps identify the surface 32b of the prism 32 that should be placed in contact with the directly opposite surface $2a_1$ of the prism 21 of the joining jig 1).

Next, a plurality of combinations of two prisms 32 and 33 each selected from one of a plurality of classes are each associated with, of a plurality of precision plates 4 having different widths, one having the corresponding width (S4, the associating step). One example of how the height of the prism 32 and the height of the prism 33 are associated with the width d of the precision plate 4 is shown in Table 1.

TABLE 1

| Precision Plate Thickness d | Glass Material Heights a, b |
|---|---|
| Small: 3.975 mm | Small, Small |
| | Small, Medium |
| Medium: 4.000 mm | Medium, Medium |
| Large: 4.025 mm | Medium, Large |
| | Large, Large |

Figure 7:
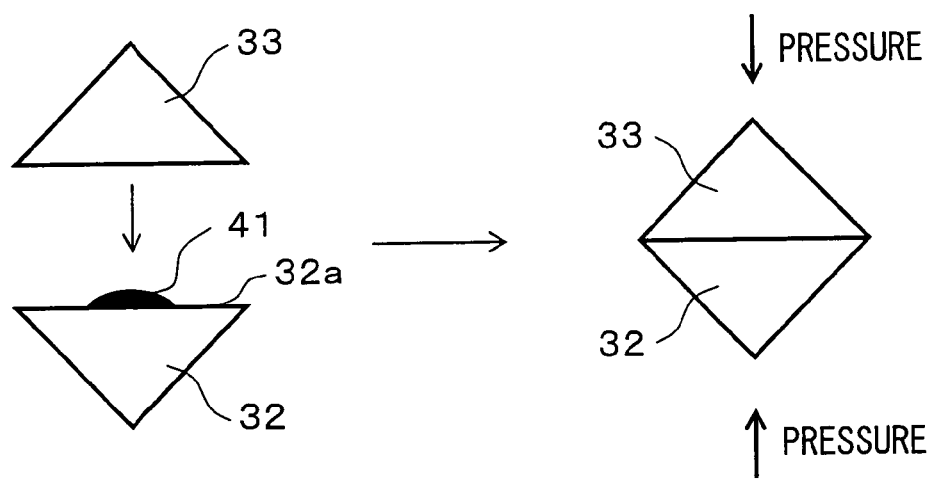
FIG. 7 is a diagram schematically illustrating how the two prisms are bonded together with an adhesive between them.

Subsequently, two prisms 32 and 33 are selected each from one of the classes; then, as shown in FIG. 7, with an adequate amount of an ultraviolet-curing adhesive 41 applied over the oblique surface 32a of one prism 32, the other prism 33 is put on it, and the two prisms are bonded together (S5, the bonding step). Then, the two prisms 32 and 33 are pressed to make the layer of the adhesive 41 thin and to drive out, along with the excessive adhesive 41, air bubbles trapped between the prisms 32 and 33. The adhesive 41 driven out from between the prisms 32 and 33 are wiped off. The two prisms 32 and 33 may be selected from the same class, or may be selected from different classes.

Figure 8:
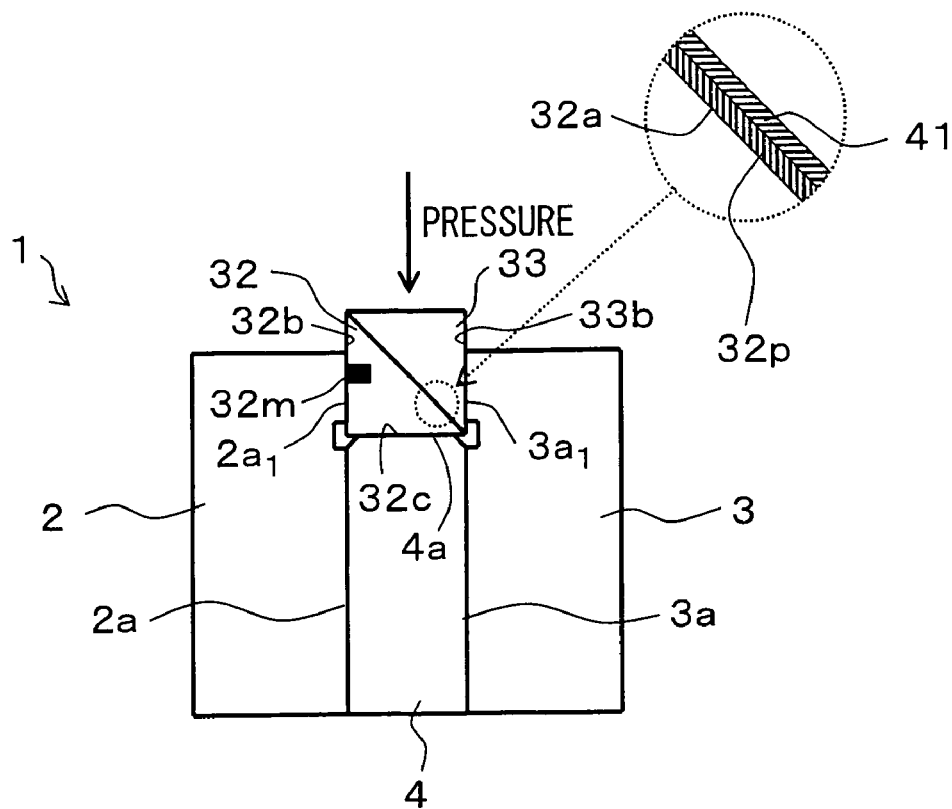
FIG. 8 is a diagram schematically illustrating how the two prisms, bonded together, are put onto the joining jig and pressed.

Next, as shown in FIG. 8, the prisms 32 and 33 thus bonded together are put onto the joining jig 1 and pressed (S6, the pressing step). More specifically, the precision plate 4 having a width d corresponding to one of the prisms 32 and 33 is selected (see Table 1), and the prism 32 and 33 are pressed from above with a surface 32c of the prism 32 other than its oblique surface 32a placed in contact with the surface 4a of the precision plate 4, with another surface 32b of the prism 32 other than its oblique surface 32a placed in contact with the directly opposite surface $2a_1$ of the holding plate 2, and with a surface 33b of the prism 33 other than its oblique surface 33a placed in contact with the directly opposite surface $3a_1$ of the holding plate 3. The two prisms 32 and 33 are so pressed as to be securely put onto the left and right holding plates 2 and 3.

Here, to prevent the polarizing beam splitting film 32p on the oblique surface 32a from intercepting the ultraviolet rays with which the adhesive 41 is irradiated in the next, preliminary curing step, the two prisms 32 and 33 are put onto the joining jig 1 with the prism 32 having the polarizing beam splitting film 32p formed thereon located under the prism 33, and with the identification mark 32m located at the directly opposite surface $2a_1$ of the joining jig 1. In this state, the adhesive 41 is irradiated with ultraviolet rays so as to be preliminarily cured (S7, the preliminary curing step).

Figure 9:
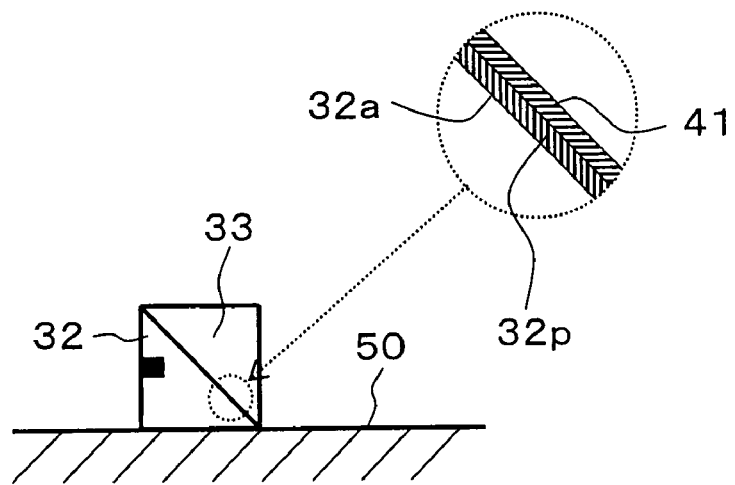
FIG. 9 is a sectional view of the two prisms placed on the stage of a complete curing machine.

Thereafter, one holding plate 3 is separated from the precision plate 4, and the prisms 32 and 33 are taken off the joining jig 1 so as to be then subjected to complete curing on a complete curing machine (S8, the complete curing step). Here again, as shown in FIG. 9, to prevent the polarizing beam splitting film 32p on the oblique surface 32a from intercepting the ultraviolet rays with which the adhesive 41 is irradiated, the two prisms 32 and 33 are placed on the stage 50 of the complete curing machine with the prism 32 having the polarizing beam splitting film 32p formed on it located under the prism 33, and then the adhesive 41 is irradiated with ultraviolet rays to be completely cured.

Figure 10:
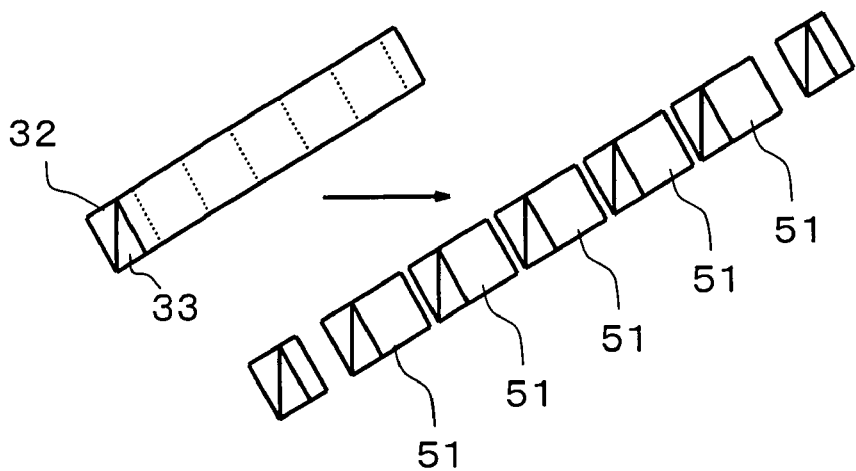
FIG. 10 is a diagram schematically illustrating how the two prisms, bonded together, are cut at predetermined widths into discrete optical devices.

Lastly, as shown in FIG. 10, with the adhesive 41 completely cured, the two prisms 32 and 33 are cut at predetermined widths into, as fabricated products, discrete optical devices 51 having a cubic shape (S9, the cutting step). Here, the prisms 32 and 33 are cut with the prism 32 having the polarizing beam splitting film 32p formed on it used as a reference. The reasons (benefits) will be explained later.

The variations that are estimated, through calculation, to appear in the horizontal and vertical widths w and v of the optical devices 51 due to variations in the width d of the precision plate 4 and the heights b and a of the prisms 32 and 33 are as shown in Table 2.

TABLE 2

| Precision Plate Thickness d | Glass Material Heights a, b | Horizontal Width w | Vertical Width v | |
|---|---|---|---|---|
| | | | Maximum | Minimum |
| Small: 3.975 mm | Small, Small | 3.975 mm | 3.996 mm | 3.967 mm |
| | Small, Medium | | 4.024 mm | 3.981 mm |
| Medium: 4.000 mm | Medium, Medium | 4.000 mm | 4.027 mm | 3.971 mm |
| Large: 4.025 mm | Medium, Large | 4.025 mm | 4.016 mm | 3.974 mm |
| | Large, Large | | 4.030 mm | 4.002 mm |

In reality, the estimated variations are exacerbated by the pyramid errors in the long-size triangular prisms 32 and 33, the thickness of the adhesive 41, the joining error, the variation in the finished width d of the precision plate 4, the measurement error, etc., each about several micrometers. Even these factors are taken into consideration, it is possible to achieve, with an ample margin, the desired accuracy of within 4±0.05 mm in exterior dimensions.

Although this embodiment assumes that the accuracy desired in exterior dimensions is within 4±0.05 mm, even in a case where a higher accuracy in exterior dimensions is desired, it is possible, on the same principles as in this embodiment, to find the conditions that meet the corresponding requirements. For example, in a case where the accuracy desired in exterior dimension is within 4±0.03 mm, prisms 32 and 33 are classified, according to their height, into one of the following classes: small (with a height in the range of 2.828−0.015 to 2.828−0.005 mm); medium (with a height in the range of 2.828−0.005 to 2.828+0.005 mm); and large (with a height in the range of 2.828+0.005 to 2.828+0.015 mm). Correspondingly, three precision plates 4 having different widths d are prepared, specifically: small (with a width of 3.980 mm), medium (with a width of 4.000 mm), and large (with a width of 4.020 mm). And, each combination of two prisms 32 and 33 is pressed by use of the precision plate 4 having the corresponding width. In this way, it is possible to achieve the above-mentioned accuracy of within 4±0.03 mm in exterior dimensions.

The above description deals with an example in which the prisms 32 and 33 are long-size ones. It is however also possible to apply the fabrication method described above in a case where an optical device is fabricated by bonding together two prisms that have, from the beginning, a size corresponding to a single cubic optical device. In that case, the cutting step S9 described above is unnecessary.

As described above, the method whereby an optical device 51 is fabricated in this embodiment includes: a bonding step of bonding two prisms 32 and 33 together with an adhesive 41; and a pressing step of putting the two prisms 32 and 33, thus bonded together, onto a joining jig 1 and pressing them. Here, the joining jig 1 includes: a pair of holding plates 2 and 3 arranged opposite each other; and a precision plate 4 held between parts of the directly opposite surfaces 2a and 3a of the holding plates 2 and 3. Moreover, in the pressing step, the two prisms 32 and 33 are pressed with a surface 32c of one prism 31 (where it has an anti-reflection film formed) placed in contact with a surface 4a of the precision plate 4, with another surface 32c of the same prism 31 (where it has an anti-reflection film formed) placed in contact with the directly opposite surface $2a_1$ of one holding plate 2, and with a surface 33b of the other prism 32 (where it has an anti-reflection film formed) placed in contact with the directly opposite surface $3a_1$ of the other holding plate 3.

In this way, it is possible to fabricate an optical device 51 by at least bonding together and then pressing two prisms 32 and 33. Thus, the optical device 51 can be fabricated without repetition of laying together, cutting, and polishing as conventionally practiced, and hence with almost no accumulation of processing errors as conventionally arising in different steps. Accordingly, the position of the junction surface between the two prisms 32 and 33 is less likely to vary from one optical device 51 to another; thus, it is possible to easily obtain the desired accuracy in the position of the junction surface. As a result, when an optical device 51 fabricated by the method according to the present invention is applied to, for example, an optical pickup, it is possible to easily achieve the tolerated beam shift (within ±0.05 mm).

Moreover, in the pressing step, the two prisms 32 and 33 are pressed with two surfaces of the prism 32 other than its oblique surface 32a (the surfaces 32c and 32b) placed in contact with two surfaces of the joining jig 1 (the surface 4a of the precision plate 4 and the directly opposite surface $2a_1$ of the holding plate 2), and with one surface of the prism 33 other than its oblique surface 33a (the surface 33b) placed in contact with one surface of the other holding plate 3 (the directly opposite surface $3a_1$). Thus, irrespective of variations in the chamfering done on the two prisms 32 and 33, the exterior shape of the optical device 51 is restricted by the directly opposite surfaces $2a_1$ and $3a_1$ of the holding plates 2 and 3. Thus, it is possible to easily obtain the desired accuracy in exterior dimensions (for example, 4±0.05 mm).

As described above, with the fabrication method of this embodiment, it is possible to achieve the tolerated beam shift and the desired accuracy in exterior dimensions at the same time easily.

The method whereby an optical device 51 is fabricated in this embodiment further includes: a classifying step of classifying a plurality of prisms 31 into a plurality of classes according to their height; and an associating step of associating every combination of two prisms 32 and 33 each selected from one of the plurality of classes with, of a plurality of precision plates having different widths d, one having a predetermined width. Thus, in the pressing step mentioned above, the prisms 32 and 33 are pressed by use of the precision plate 4 associated with the two prisms 32 and 33 used.

The plurality of prisms 31 are classified into different classes according to their height (that is, their size), and the two prisms 32 and 33 that are actually bonded together are selected from the plurality of prisms 31, each from one of the plurality of classes. In this embodiment, the two prisms 32 and 33 that are bonded together are pressed by use of the precision plate 4 associated with that combination of two prisms 32 and 33 (the precision plate 4 having a width d corresponding to that combination).

In this way, for every combination of two prisms 32 and 33, the horizontal width w of the optical device 51, which corresponds to the width d of the precision plate 4, can be brought into the accuracy demanded in exterior dimensions (the nominal dimension±α mm). Moreover, the two prisms 32 and 33 that are bonded together are right-angled prisms, and thus, in this embodiment, the two prisms 32 and 33 can be pressed without causing deviated joining. Thus, for every combination of two prisms 32 and 33 used, the vertical width v of the optical device 51 can also be brought into the accuracy demanded in exterior dimensions. This helps obtain the desired accuracy in exterior dimensions even when a less strict tolerance is admitted in the procured prisms 31, and thus helps reduce the fabrication cost of the optical device 51.

Moreover, the plurality of prisms 31 are classified not according to their width but according to their height. Thus, even if there are variations in the chamfering at corners of the prisms 31, they do not affect the classification of the prisms 31. That is, irrespective of variations in the chamfering at corners of the prisms 31, the height of the prisms 31 remains constant, and this permits proper classification of the prisms 31.

Moreover, there are provided as many precision plates 4 with different widths d (in this embodiment, three, namely small, medium, and large) as there are classes for classification in the classifying step. This makes it possible to surely select the precision plate 4 having a width d corresponding to a combination of two prisms 32 and 33 irrespective of which class they are each selected from.

Suppose that the plurality of classes are, in increasing order of prism height, class 1 (small), class 2 (medium), and class 3 (large), then, in the associating step mentioned above, as shown in Tables 1 and 2, (1) a combination of two prisms 32 and 33 both belonging to class 2 is associated with the precision plate 4 having a width d (4.000 mm) equal to the nominal dimension; (2) a combination of two prisms 32 and 33 both belonging to class 1, or a combination of a prism 33 belonging to class 1 and a prism 32 belonging to class 2, is associated with the precision plate 4 having a width d (3.975 mm) smaller than the nominal dimension; and (3) a combination of two prisms 32 and 33 both belonging to class 3, or a combination of a prism 33 belonging to class 2 and a prism 32 belonging to class 3, is associated with the precision plate 4 having a width d (4.025 mm) larger than the nominal dimension.

Thus, in a case where the plurality of prisms 31 are classified into three classes, namely class 1, class 2, and class 3, through the association described above, it is possible to surely bring the horizontal and vertical widths w and v of the optical devices 51 composed of different combinations of two prisms 32 and 33 mentioned above into the desired accuracy in exterior dimensions (for example, 4±0.05 mm).

The method whereby an optical device 51 is fabricated in this embodiment further includes: a thin film forming step of forming an optical thin film (for example, a polarizing beam splitting film 32p) on the junction surface (the oblique surface 32a) of one prism 32. This thin film forming step is performed before the bonding step mentioned above. Thus, in the bonding step, one prism 32 having an optical thin film formed on its junction surface and another prism 33 are bonded together with an adhesive 41. This makes it possible to eventually fabricate an optical device 51 having the optical property (for example, a polarizing beam splitting capability) of that optical thin film.

Specifically, in this embodiment, the optical thin film so formed is a polarizing beam splitting film 32p that transmits or reflects incident light according to its polarization state. Thus, the optical device 51 fabricated by the method of this embodiment can be used as a polarizing beam splitter (PBS) in an optical pickup.

The optical thin film formed on the junction surface of one prism 32 may be one that either transmits or reflects incident light selectively according to its wavelength. In that case, the optical device 51 obtained can be used as a dichroic prism. That is, the method whereby an optical device 51 is fabricated in this embodiment is applicable also to a case where a prism 32 having an optical thin film other than a polarizing beam splitting film 32p formed thereon and another prism 33 are bonded together to fabricate an optical device 51.

Moreover, the method whereby an optical device 51 is fabricated in this embodiment further includes a cutting step of cutting the two prisms 32 and 33, pressed in the pressing step mentioned above, at predetermined widths into discrete optical devices 51. In this cutting step, the two prisms 32 and 33 are cut with the prism 32 having the optical thin film formed on it used as a reference.

Figure 11:
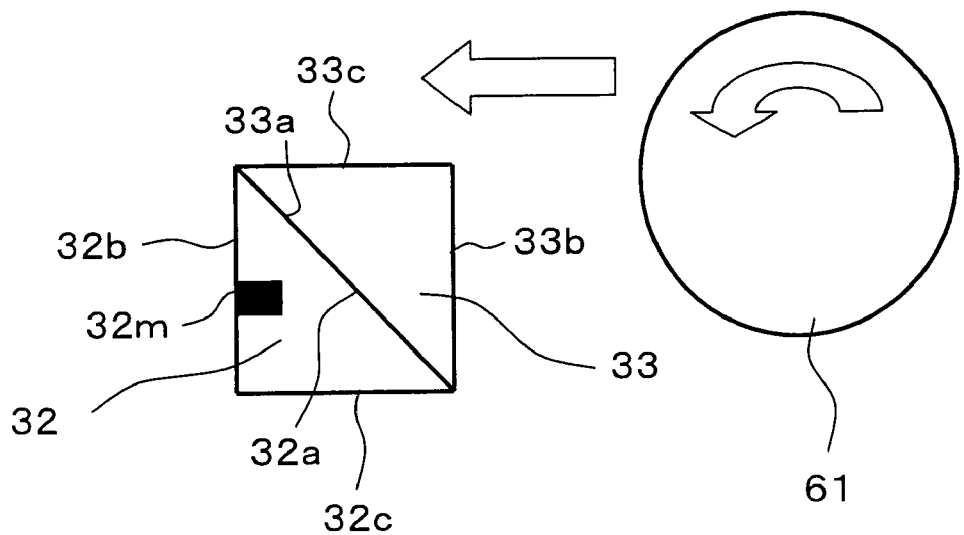
FIG. 11 is a diagram schematically illustrating how the two prisms, bonded together, are cut with a cutter.

In this way, it is possible, as shown in FIG. 11, to cut the two prisms 32 and 33 with a cutter 61 so that the cut surfaces are, for example, perpendicular to the junction surface (the oblique surface 32a) of the prism 32 having the optical thin film formed on it. Thus, a good perpendicularity is obtained between the junction surface and the cut surfaces. At the same time, a good perpendicularity is obtained also between the other surfaces than the junction surface of the prism 32 having the optical thin film formed on it and the cut surfaces. Furthermore, the directly opposite surfaces $2a_1$ and $3a_1$ of the holding plates 2 and 3 of the joining jig 1 are parallel to each other, and accordingly the surface 32b of the prism 32 and the surface 33b of the prism 33, which are pressed onto the directly opposite surfaces $2a_1$ and $3a_1$ respectively, are parallel to each other. Thus, a good perpendicularity is obtained between the cut surfaces and the surface 33b as well.

On the other hand, the surface 33c of the prism 33 is affected by the error in the angle between itself and the surface 33b (the pyramid error), and thus its perpendicularity relative to the cut surfaces is slightly poorer than that of the other three surfaces (32b, 32c, and 33b). Even then, by reducing the pyramid error just mentioned, it is possible to improve the perpendicularity of the surface 33c relative to the cut surfaces.

The above description deals with a case where a plurality of prisms 31 are classified into three classes. It is however also possible to classify them into two classes. In that case, in the classifying step S2, the average of the height of each prism 31 at its one and other ends is calculated so that a plurality of prisms 31 are classified into one of the following two classes, small and large, according to which of the ranges noted below their average height falls in:

small, with a height in the range of 2.828−0.02 to 2.828+0.00 mm; and large, with a height in the range of 2.828+0.00 to 2.828+0.02 mm.

Correspondingly, for a given nominal dimension (4.000 mm), two precision plates 4 having different widths d are prepared, specifically: small (with a width of 3.970 mm) and large (with a width of 4.027 mm). According to the height of one of the two prisms 32 and 33 combined together, one of the two precision plates 4 is selected and used.

Assuming that devices 51 are fabricated each by combining together two prisms selected from the same one of two classes into which procured prisms 31 have been classified, Table 3 shows the variations that are estimated, through calculation, to appear, in the horizontal and vertical widths w and v of the optical devices 51 due to variations in the width d of the precision plate 4 and the heights b and a of the prisms 32 and 33 combined together.

TABLE 3

| Precision Plate Thickness d | Glass Material Heights a, b | Horizontal Width w | Vertical Width v | |
|---|---|---|---|---|
| | | | Maximum | Minimum |
| Small: 3.970 mm | Small, Small | 3.970 mm | 4.029 mm | 3.972 mm |
| Large: 4.027 mm | Large, Large | 4.027 mm | 4.028 mm | 3.972 mm |

The results shown in Table 3 indicate that, also when optical devices 51 are fabricated with two-class classification, it is possible to achieve, with an ample margin, the desired accuracy of within 4±0.05 mm in exterior dimensions.

That is, in the method whereby an optical device 51 is fabricated in this embodiment, suppose that the plurality of classes are, in increasing order of prism height, class 1 (small) and class 2 (large), then, the associating step mentioned above may proceed as follows: (1) a combination of two prisms 32 and 33 both belonging to class 1 is associated with the precision plate 4 having a width d (3.970 mm) smaller than the nominal dimension; and (2) a combination of two prisms 32 and 33 both belonging to class 2 is associated with the precision plate 4 having a width d (4.027 mm) larger than the nominal dimension. Thus, in a case where the plurality of prisms 31 are classified into two classes, through the association described above, it is possible to surely bring the horizontal and vertical widths w and v of the optical devices 51 composed of a combination of two prisms 32 and 33 selected from the same one of the classes into the desired accuracy in exterior dimensions (for example, 4+0.05 mm).

Incidentally, in a case where procured prisms 31 are classified into two classes, the prisms 32 and 33 joined together are either a combination of two small ones (both belonging to class 1) or a combination of two large ones (both belonging to class 2). Thus, the number of different combinations here is smaller than in a case where three-class classification is adopted, and this leads to less flexibility in the stock management of glass materials. Moreover, as will be understood from Tables 2 and 3, here, the difference between the maximum and minimum of the vertical width v is larger than when the prisms 32 and 33 joined together are a combination of two small ones or two large ones in a case where three-class classification is adopted. From this perspective, it is better to classify the prisms 31 into three classes than to classify them into two classes. Specifically, compared with two-class classification, three-class classification helps reduce the difference between the maximum and minimum of the vertical width v of the optical device 51 and hence the difference between the horizontal and vertical widths w and v. This makes it possible to give the optical device 51 a shape closer to a perfect cube.

The classifying may be performed into any number equal to or greater than two. The larger the number, the smaller the difference between the horizontal and vertical widths w and v of an optical device 51 obtained by combining together two prisms 32 and 33 of the same class. This means that the sectional shape of the optical device 51 is closer to a perfect square (that is, the shape of the optical device 51 as a whole is closer to a perfect cube). The closer to a perfect cube, the closer together the optical path lengths of the light transmitted through and reflected in the optical device 51. From this perspective, the larger the number of classes, the better.

An excessively large number of classes, however, necessitates as many precision plates 4 having corresponding widths d and involves complicated combinations of prisms 32 and 33, each combination requiring a corresponding precision plate 4. Accordingly, the number of classes should be determined to strike a practical balance between the customer requirements (the accuracy desired in the dimensions of the optical device 51) and the ease of processing (the ease of classifying and associating).

The discussion thus far deals with a method for fabricating a cubic optical device 51 with high accuracy by joining together two triangular prisms having a right-angled isosceles triangular section. The fabrication method of this embodiment, however, is not limited to the joining of prisms having such a shape, but may be applied to the fabrication of any optical device that has two pairs of mutually parallel opposite surfaces. This will now be described by way of simple examples.

Figure 12:
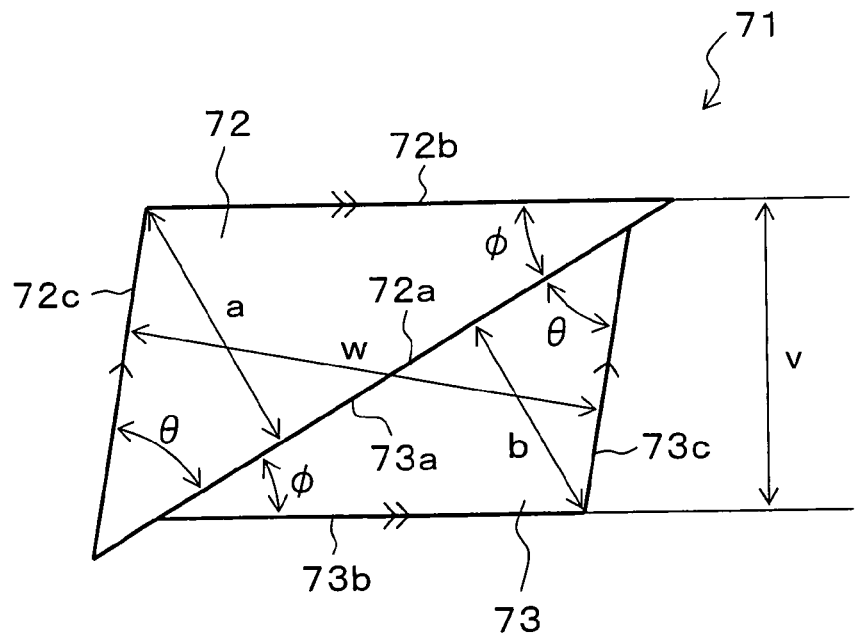
FIG. 12 is a sectional view of an optical device composed of two triangular prisms bonded together where one of the interior angles of the triangular section of each prism is obtuse.

FIG. 12 is a sectional view of an optical device 71 composed of two triangular prisms 72 and 73 bonded together where one of the interior angles of the triangular section of each prism is obtuse. The prism 72 has an oblique surface 72a, and has two surfaces 72b and 72c that face the oblique surface 72a and are located on both sides of the obtuse angle. Likewise, the prism 73 has an oblique surface 73a, and has two surfaces 73b and 73c that face the oblique surface 73a and are located on both sides of the obtuse angle. The oblique surface 72a of the prism 72 and the oblique surface 73a of the prism 73 are joined together with an optical thin film and an adhesive between them, and thereby the optical device 71 is formed. As a result of the joining, the surface 72b of the prism 72 and the surface 73b of the prism 73 are parallel to each other, and so are the surface 72c of the prism 72 and the surface 73c of the prism 73.

Figure 13:
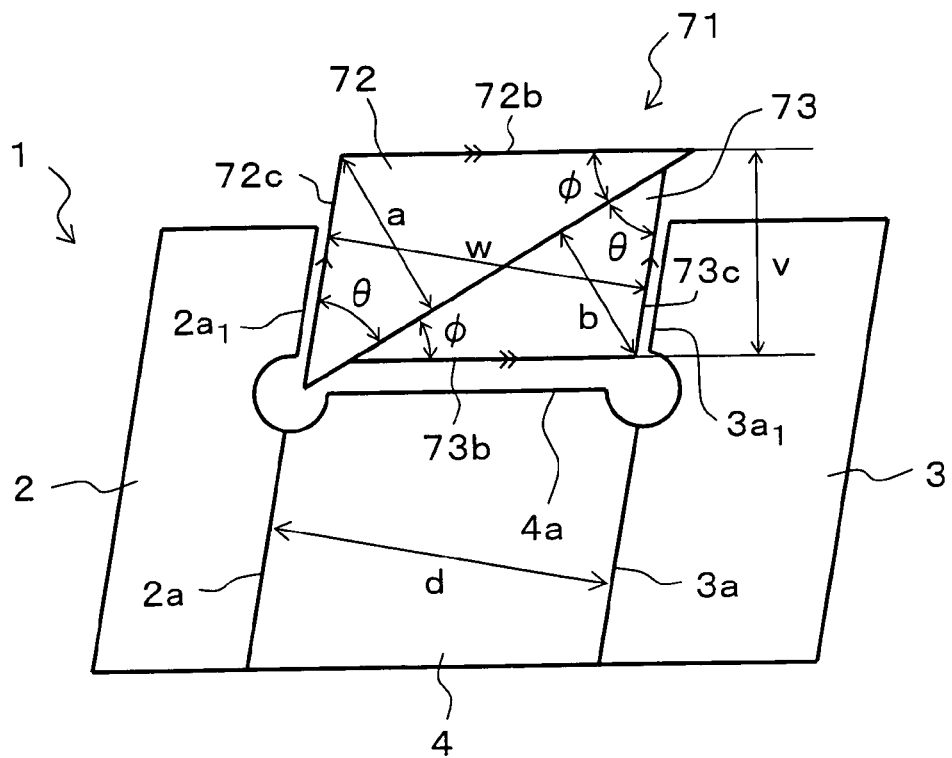
FIG. 13 is a sectional view showing an outline of the structure of a joining jig used to press the above two triangular prisms.

In the pressing step mentioned previously, the prisms 72 and 73 are pressed by use of a joining jig 1 as shown in FIG. 13. In the joining jig 1 shown in FIG. 13, the directly opposite surfaces 2a and 3a are slanted relative to the surface 4a so that the surface 72c of the prism 72 is placed in contact with the directly opposite surface $2a_1$ of the holding plate 2, that the surface 73b of the prism 73 is placed in contact with the surface 4a of the precision plate 4, and that the surface 73c is placed in contact with the directly opposite surface $3a_1$ of the holding plate 3.

Here, with respect to the prism 72, let its height be a; let one interior angle, other than the obtuse angle, of its triangular section (the angle between the surfaces 72a and 72c) be θ (degrees); let the other interior angle, other than the obtuse angle, of its triangular section (the angle between the surfaces 72a and 72b) be φ (degrees). Likewise, with respect to the prism 73, let its height be b; let one interior angle, other than the obtuse angle, of its triangular section (the angle between the surfaces 73a and 73c) be φ (degrees); let the other interior angle, other than the obtuse angle, of its triangular section (the angle between the surfaces 73a and 73b) be φ (degrees). Then, in terms of the just defined variables a, b, θ, and φ and the width d of the precision plate 4 of the joining jig 1, the horizontal width w (the distance between the surface 72c and 73c) and the vertical width v (the distance between the surfaces 72b and 73b) of the optical device 71 are given by the following formulae. Here, all the variables a, b, d, w, and v are in mm.

$$w = d \tag{1}$$

$$v = \frac{\sin(\theta + \phi)}{\sin\theta}(a + b) - \frac{\sin\phi}{\sin\theta}d \tag{2}$$

Accordingly, on the same principles as in the fabrication of a cubic optical device 51, by properly setting the dimensions a, b, and d, it is possible to control w and v within the desired tolerance range. Although not considered in the fabrication of a cubic optical device 51, if θ and φ are tolerated to deviate within ±5 minutes, v can accordingly deviate by about 0.012 mm. This requires that the variables a, b, and d be determined with a margin ample enough to allow for variations in those angles.

Incidentally, in a case where the optical device 71 is cubic, in formula (2) above, θ=45 degrees and φ=45 degrees. Hence, formula (2) can then be rewritten to $$v = \sqrt{2}(a+b) - d \tag{3}$$

This formula agrees with the one (v=a×√2+b×√2−d) relied upon in the fabrication of a cubic optical device 51.

Figure 14:
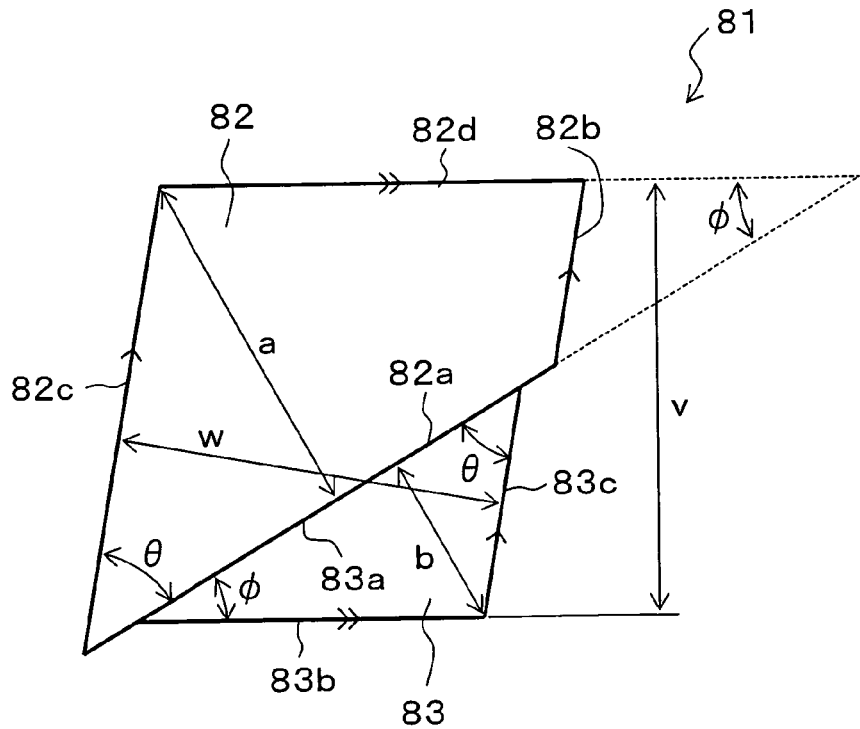
FIG. 14 is a sectional view of another optical device composed of two prisms bonded together.

FIG. 14 is a sectional view of yet another optical device 81. This optical device 81 is composed of prisms 82 and 83 bonded together. The prism 82 is a quadrangular prism having a trapezoidal section. The prism 82 has a junction surface 82a at which it is joined with the prism 83, also has mutually parallel surfaces 82b and 82c that at their respective one ends connect to the junction surface 82a, and further has a surface 82d to which the surfaces 82b and 82c connect at their respective other ends—the ends opposite to those at which the surfaces 82b and 82c connect to the junction surface 82a.

The prism 83 is a triangular prism in which one of the interior angles of its triangular section is obtuse. The prism 83 has an oblique surface 83a, and has two surfaces 83b and 83c that face the oblique surface 83a and are located on both sides of the obtuse angle. The junction surface 82a of the prism 82 and the oblique surface 83a of the prism 83 are joined together with an optical thin film and an adhesive between them, and thereby the optical device 81 is formed. As a result of the joining, the surface 82d of the prism 82 and the surface 83b of the prism 83 are parallel to each other, and so are the surface 82c of the prism 82 and the surface 83c of the prism 83. Moreover, the surface 82b of the prism 82 and the surface 83c of the prism 83 are not flush with each other, but are parallel to each other.

Figure 15:
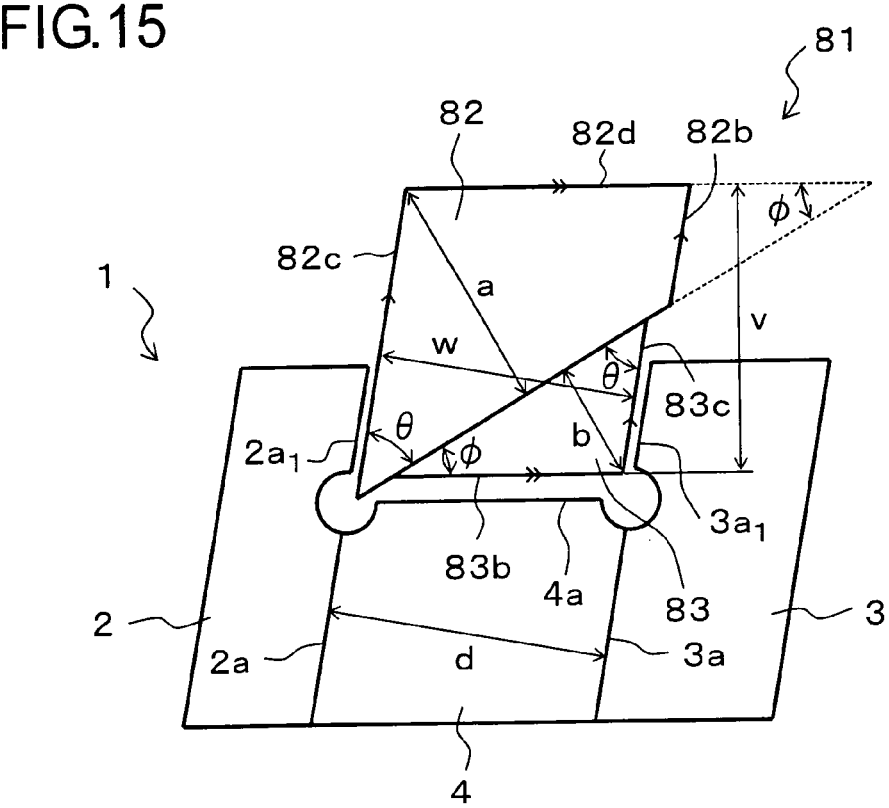
FIG. 15 is a sectional view showing an outline of the structure of a joining jig used to press the above two triangular prisms.
Figure 16:
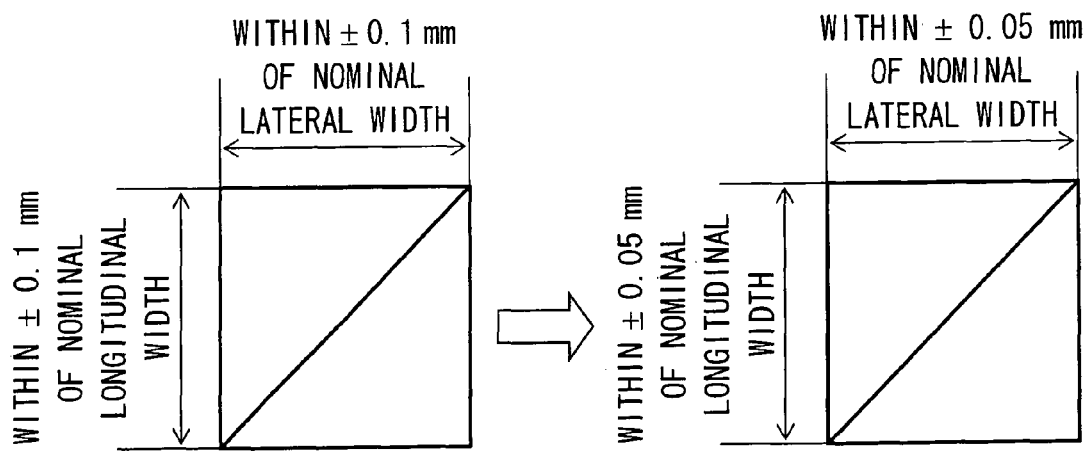
FIG. 16 is a diagram schematically illustrating the accuracy conventionally desired in exterior dimensions in pickup prisms.
Figure 17:
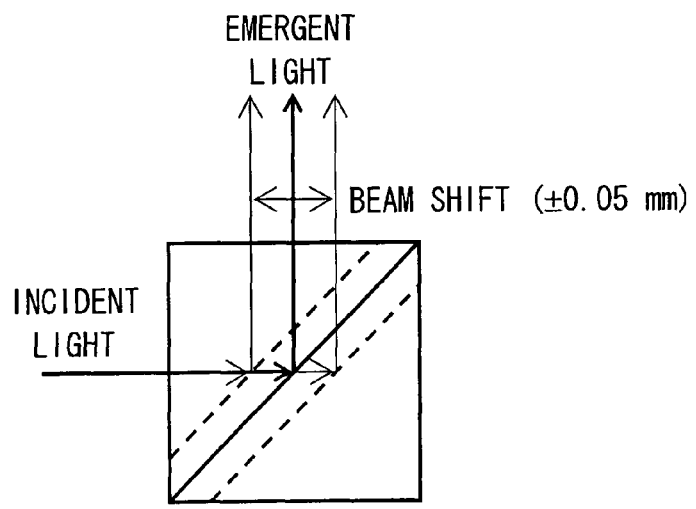
FIG. 17 is a diagram schematically illustrating the beam shift conventionally tolerated in pickup prisms.
Figure 18:
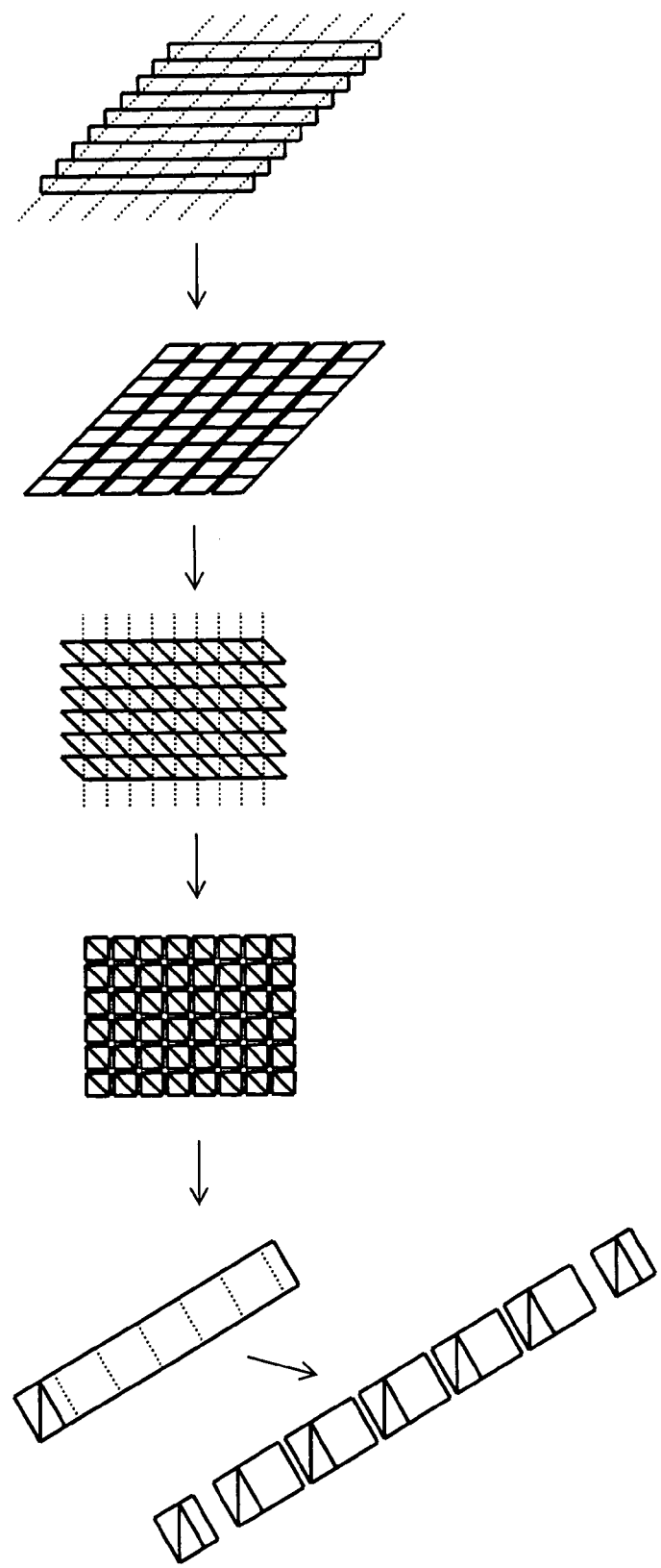
FIG. 18 is a diagram illustrating the individual steps of an example of a conventional method for fabricating an optical device.
Figure 19:
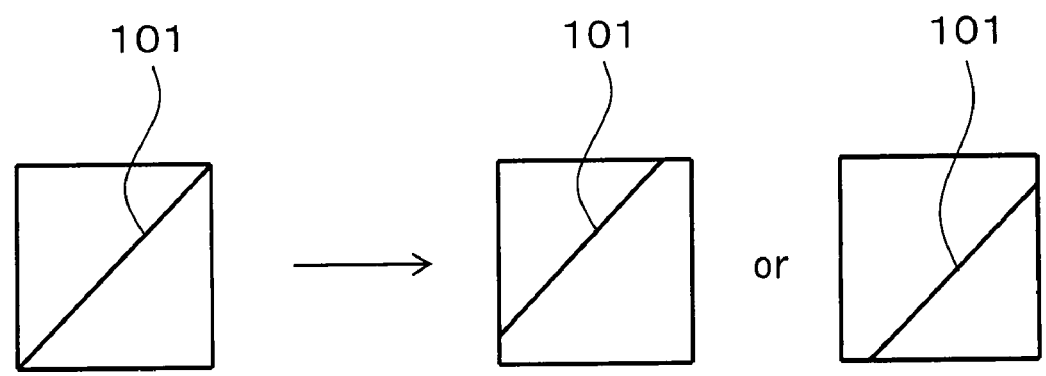
FIG. 19 is a diagram illustrating pickup prisms having a deviated junction surface.
Figure 20:
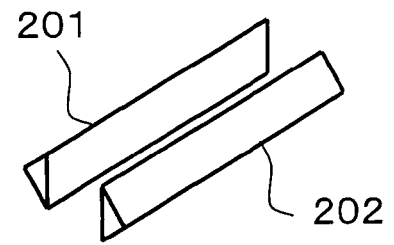
FIG. 20 is a diagram illustrating the individual steps of another example of a conventional method for fabricating an optical device.
Figure 20:
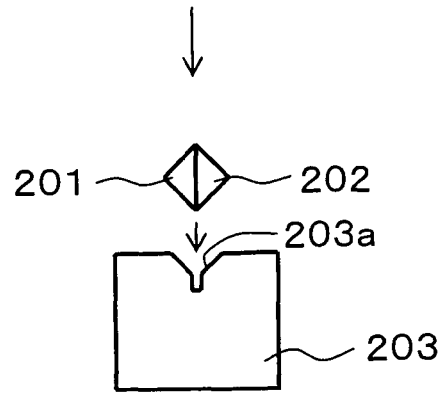
Figure 20:
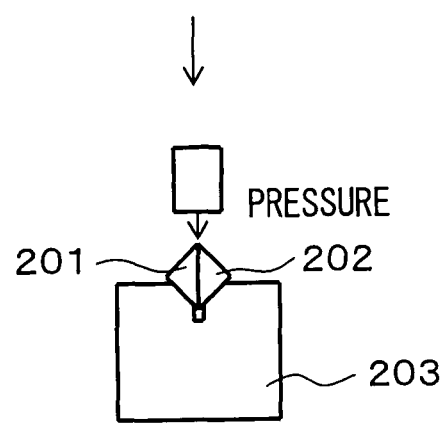
Figure 20:
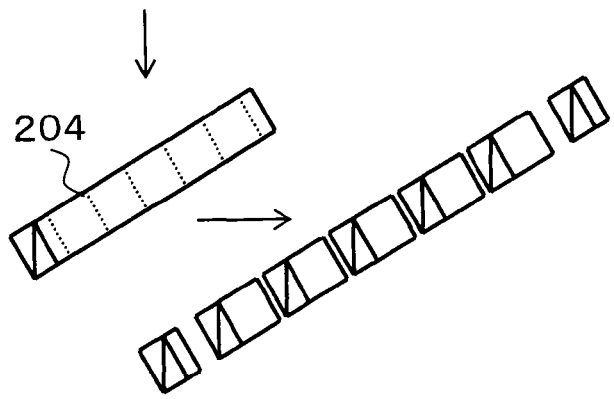
Figure 21:
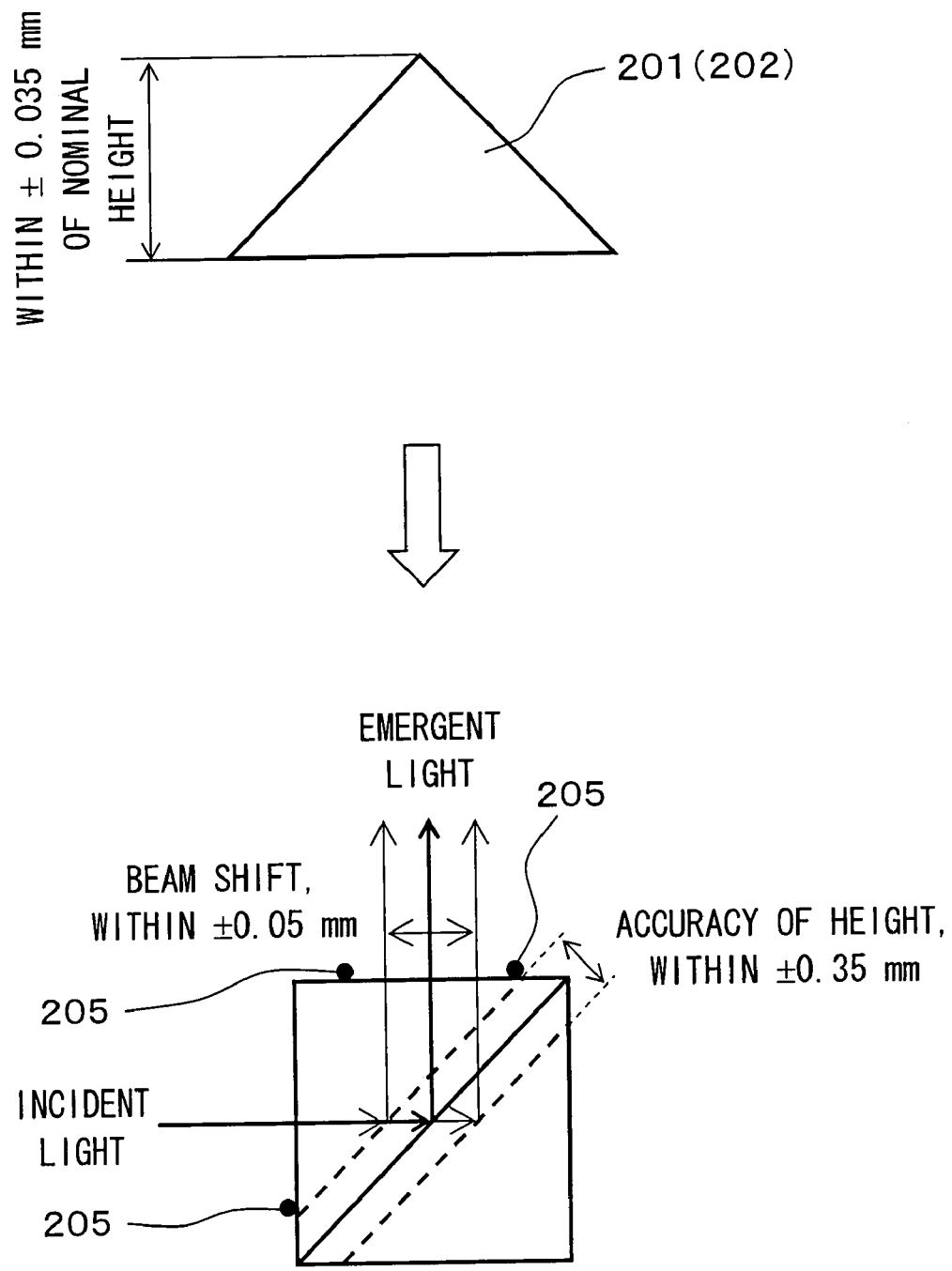
FIG. 21 is a diagram schematically illustrating how the above optical device is positioned during assembly.
Figure 22:
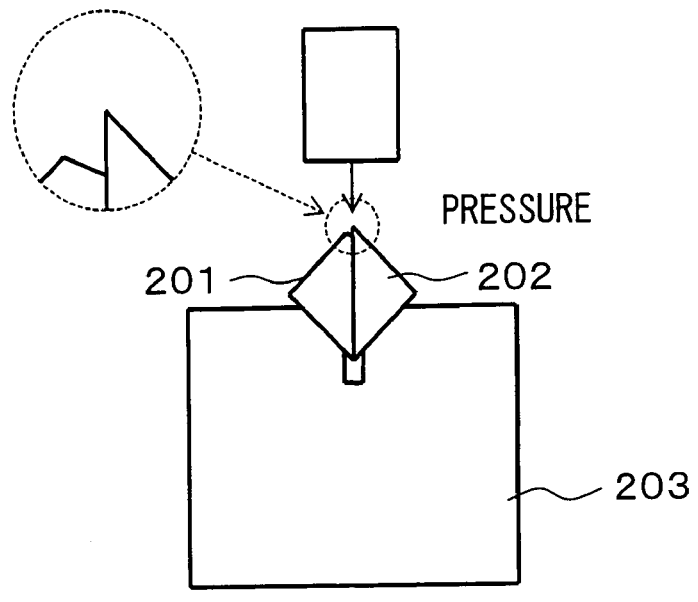
FIG. 22 is a diagram illustrating how a variation in the chamfering at a corner of a prism causes a deviation in the junction between two prisms under a pressure.
Figure 22:
Figure 22:
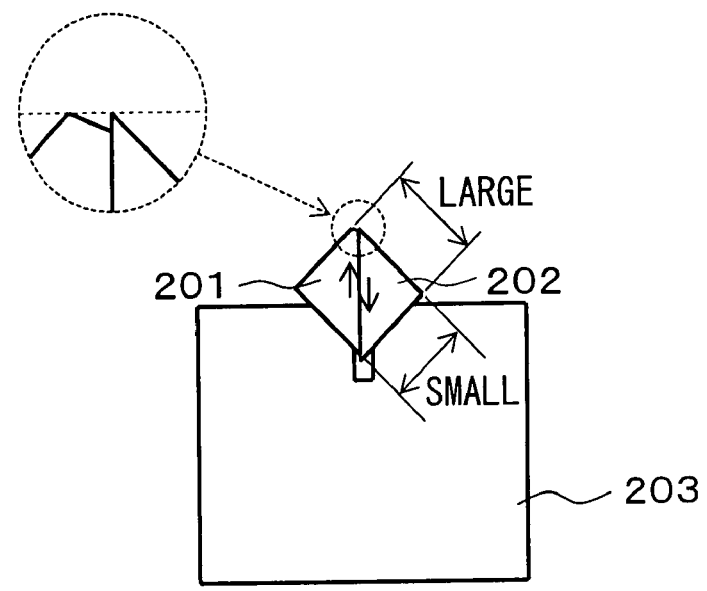

In the pressing step mentioned previously, the prisms 82 and 83 are pressed by use of a joining jig 1 as shown in FIG. 15. In the joining jig 1 shown in FIG. 15, the directly opposite surfaces 2a and 3a are slanted relative to the surface 4a so that the surface 82c of the prism 82 is placed in contact with the directly opposite surface $2a_1$ of the holding plate 2, that the surface 83b of the prism 83 is placed in contact with the surface 4a of the precision plate 4, and that the surface 83c is placed in contact with the directly opposite surface $3a_1$ of the holding plate 3.

Here, with respect to the prism 82, let its height (as measured with the junction surface 82a at the bottom) be a; let the angle between the surfaces 82a and 82c be θ (degrees); let the angle between the surfaces 82a and 82d be φ (degrees). Moreover, with respect to the prism 83, let its height be b; let one interior angle, other than the obtuse angle, of its triangular section (the angle between the surfaces 83a and 83c) be θ (degrees); let the other interior angle, other than the obtuse angle, of its triangular section (the angle between the surfaces 83a and 83b) be φ (degrees). Then, in terms of the just defined variables a, b, θ, and φ and the width d of the precision plate 4 of the joining jig 1, the horizontal width w (the distance between the surface 82c and 83c) and the vertical width v (the distance between the surfaces 82d and 83b) of the optical device 81 are given by formulae (1) and (2) presented previously. Thus, also in the fabrication of the optical device 81 composed of the prisms 82 and 83 that have been bonded together, by properly setting the dimensions a, b, and d, it is possible to control w and v within the desired tolerance range.

The above description has dealt with how to achieve the desired accuracy of 4±0.05 mm in exterior dimensions in the fabrication of a 4×4 mm optical device 51. It should be understood, however, that the fabrication method according to the present invention finds application no matter what the size of the optical device 51 to be eventually fabricated is. For example, even in a case where a 10×10 mm or larger optical device 51 is fabricated, so long as the accuracy desired in exterior dimensions is within ±0.05 mm, it is possible to apply the fabrication method according to the present invention.

The method and the joining jig for the fabrication of an optical device according to the present invention can be used, for example, to fabricate a polarizing beam splitter for use in an optical pickup.

As described above, according to the present invention, two prisms that are bonded together in a bonding step are put onto a joining jig and pressed in a pressing step, and thereby an optical device is fabricated. The two prisms may be long-size ones, or may be ones so sized as to correspond to a single optical device. In the former case, the two prisms that have been pressed are then cut at predetermined widths into a plurality of optical devices. The joining jig may have a pair of holding plates and a precision plate integrally formed, or may have at least one of the holding plates formed separable from the precision plate.

In this way, it is possible to fabricate an optical device by at least bonding together and then pressing two prisms, and the optical device can be fabricated without repetition of similar steps as conventionally practiced, and hence with almost no accumulation of processing errors as conventionally arising in different steps. Accordingly, the position of the junction surface (bonding surface) between the two prisms is less likely to vary from one optical device to another; thus, it is possible to easily obtain the desired accuracy in the position of the junction surface. When an optical device fabricated by the method according to the present invention is applied to, for example, an optical pickup, an optical thin film (for example, a polarizing beam splitting film) is formed on the junction surface between the two prisms. Here, the accuracy in the position of the junction surface directly affects the beam shift—which means, with respect to the light that has entered the optical device and then reflected on the optical thin film, the deviation of this light in the direction perpendicular to its travel direction (optical axis direction). With the method according to the present invention, it is possible to easily achieve the tolerated beam shift.

Moreover, in the pressing step, the two prisms are pressed with two surfaces of one prism placed in contact with two surfaces of the joining jig, namely the exposed surface of the precision plate and the directly opposite surface of one holding plate, and with one surface of the other prism placed in contact with the directly opposite surface of the other holding plate. Thus, the two prisms move along the oblique surface of each other, and are pressed onto the directly opposite surfaces of the holding plates respectively. As a result, irrespective of variations in the chamfering done on the two prisms, the exterior shape of the joined prism is restricted by the directly opposite surfaces of the holding plates. Thus, it is possible to easily obtain the desired accuracy in the exterior dimensions of the optical device.

That is, with the fabrication method according to the present invention, it is possible to achieve the tolerated beam shift and the desired accuracy in exterior dimensions at the same time.

Obviously, many modifications and variations of the present invention are possible in light of the above teachings. It is therefore to be understood that within the scope of the appended claims, the invention may be practiced other than as specifically described.

What is claimed is:

1. A method for fabricating an optical device, comprising:
    bonding a first prism with a second prism via an adhesive, wherein the first prism is a polygonal-columnar prism comprising a first set of longitudinal sides that extend between a first set of bases and the second prism is a polygonal-columnar prism comprising a second set of longitudinal sides that extend between a second set of bases; and
    putting the first prism and the second prism, thus bonded together, onto a joining jig; and
    pressing the first prism and the second prism via the joining jig, wherein the joining jig comprises:
        a first holding plate and a second holding plate that is arranged opposite the first holding plate, wherein a gap is defined between the first and second holding plates; and
        a precision plate held between a first surface of the first holding plate and a first surface of the second holding plate that is directly opposite the first surface of the first holding plate, wherein, during the pressing:
            a first surface of one of the first set of longitudinal sides of the first prism is placed in contact with and pressed against a surface of the precision plate exposed to the gap, with a second surface of another one of the first set of longitudinal sides of the first prism placed in contact with and pressed against a second surface of the first holding plate, and with one of the second set of longitudinal sides of the second prism placed in contact with and pressed against a second surface of the second holding plate that is directly opposite the second surface of the first holding plates.

2. The method according to claim 1, wherein the first and second prisms are both right-angled prisms, and the second surface of the first holding plate and the second surface of the second holding plate are parallel to each other and perpendicular to the surface of the precision plate.

3. The method according to claim 2, further comprising:
classifying a plurality of prisms into a plurality of classes according to heights thereof; and
associating every combination of two prisms each selected from one of the plurality of classes with, of a plurality of precision plates having different widths in a direction perpendicular to the second surface of the first holding plate and the second surface of the second holding plate, one precision plate having a predetermined width, wherein, during the pressing, the one precision plate associated during the associating is used as the joining jig.

4. The method according to claim 3, wherein the one precision plate selected during the associating has a width corresponding to a height of one of the first and second prisms bonded together.

5. The method according to claim 3, wherein there are provided as many precision plates having different widths as there are classes into which prisms are classified during the classifying.

6. The method according to claim 3, wherein, let the plurality of classes be called class 1 and class 2 in increasing order of prism height, then, during the associating, a precision plate having a width smaller than a nominal dimension is associated with a combination of two prisms belonging to class 1, and a precision plate having a width greater than the nominal dimension is associated with a combination of two prisms belonging to class 2.

7. The method according to claim 3, wherein, let the plurality of classes be called class 1, class 2, and class 3 in increasing order of prism height, then, during the associating, a precision plate having a width equal to a nominal dimension is associated with a combination of two prisms belonging to class 2, and a precision plate having a width smaller than the nominal dimension is associated with a combination of two prisms belonging to class 1 or a combination of a prism belonging to class 1 and a prism belonging to class 2, and a precision plate having a width greater than the nominal dimension is associated with a combination of two prisms belonging to class 3 or a combination of a prism belonging to class 2 and a prism belonging to class 3.

8. The method according to claim 1, further comprising: forming an optical thin film on a junction surface of one of the first and second prisms, wherein the forming of the thin film is performed before the bonding of the first prism and the second prism.

9. The method according to claim 8, wherein the optical thin film is a polarizing beam splitting film that transmits or reflects incident light according to polarization state thereof.

10. The method according to claim 8, further comprising: cutting the first and second prisms, pressed during the pressing, at predetermined widths into discrete optical devices, wherein, during the cutting, the first and second prisms are cut with the one of the first and second prisms having the optical thin film formed thereon used as a reference.

11. The method according to claim 1, wherein at least one of the first and second holding plates of the joining jig is separable from the precision plate.

12. A method for fabricating an optical device, comprising:
bonding a first prism with a second prism via an adhesive, wherein the first prism is selected from the group consisting of a triangular-columnar prism and a quadrangular-columnar prism and the second prism is selected from the group consisting of a triangular-columnar prism and a quadrangular-columnar prism; and
putting the first prism and the second prism, thus bonded together, onto a joining jig; and
pressing the first prism and the second prism via the joining jig, wherein the joining jig comprises:
a first holding plate and a second holding plate that is arranged opposite the first holding plate, wherein a gap is defined between the first and second holding plates; and
a precision plate held between a first surface of the first holding plate and a first surface of the second holding plate that is directly opposite the first surface of the first holding plate, wherein, during the pressing:
a first surface of a first longitudinal side, exclusive of a base, of the first prism is placed in contact with and pressed against a surface of the precision plate exposed to the gap, with a second surface of a second longitudinal side, exclusive of a base, of the first prism placed in contact with and pressed against a second surface of the first holding plate, and with a surface of a longitudinal side, exclusive of a base, of the second prism placed in contact with and pressed against a second surface of the second holding plate that is directly opposite the second surface of the first holding plates.

13. The method according to claim 12, wherein the first surface of the first holding plate and the second surface of the first holding plate are on a common first plane, and the first surface of the second holding plate and the second surface of the second holding plate are on a common second plane.

14. The method according to claim 1, wherein the first surface of the first holding plate and the second surface of the first holding plate are on a common first plane, and the first surface of the second holding plate and the second surface of the second holding plate are on a common second plane.

15. The method according to claim 3, wherein the first surface of the first holding plate and the second surface of the first holding plate are on a common first plane, and the first surface of the second holding plate and the second surface of the second holding plate are on a common second plane.

* * * * *